US008222603B2

United States Patent
Lee

(10) Patent No.: US 8,222,603 B2
(45) Date of Patent: Jul. 17, 2012

(54) ONE CHIP IMAGE SENSOR FOR MEASURING VITALITY OF SUBJECT

(75) Inventor: Byoung-Su Lee, Yeosu-si (KR)

(73) Assignee: Siliconfile Technologies Inc., Seoul (KR)

( * ) Notice: Subject to any disclaimer, the term of this patent is extended or adjusted under 35 U.S.C. 154(b) by 178 days.

(21) Appl. No.: 12/681,766

(22) PCT Filed: Oct. 7, 2008

(86) PCT No.: PCT/KR2008/005862
§ 371 (c)(1),
(2), (4) Date: Apr. 5, 2010

(87) PCT Pub. No.: WO2009/051363
PCT Pub. Date: Apr. 23, 2009

(65) Prior Publication Data
US 2010/0245826 A1   Sep. 30, 2010

(30) Foreign Application Priority Data
Oct. 18, 2007   (KR) .................. 10-2007-0104957

(51) Int. Cl.
*G01J 1/00*   (2006.01)
(52) U.S. Cl. .................................................. 250/336.1
(58) Field of Classification Search ............... 250/336.1, 250/336.2, 330, 331, 332, 333, 334, 338.1–338.5, 250/339.01–339.15
See application file for complete search history.

(56) References Cited

U.S. PATENT DOCUMENTS

| | | | |
|---|---|---|---|
| 4,037,048 A | * | 7/1977 | Walker .................. 348/164 |
| 6,252,218 B1 | | 6/2001 | Chou |
| 2004/0174446 A1 | * | 9/2004 | Acharya .................. 348/279 |
| 2006/0114551 A1 | * | 6/2006 | Okada et al. .................. 359/350 |
| 2007/0153099 A1 | * | 7/2007 | Ohki et al. .................. 348/234 |
| 2007/0201738 A1 | * | 8/2007 | Toda et al. .................. 382/144 |

FOREIGN PATENT DOCUMENTS

| | | |
|---|---|---|
| CN | 1746660 A | 3/2006 |
| JP | 2000-059798 A | 2/2000 |
| JP | 2005-006066 A | 1/2005 |
| JP | 2006-033483 A | 2/2006 |
| KR | 1020040059770 A | 7/2004 |
| KR | 1020060077705 A | 7/2006 |

OTHER PUBLICATIONS

PCT International Search Report of International Application No. PCT/KR2008/005862.
PCT Written Opinion of the International Searching Authority for International Application No. PCT/KR2008/005862.

* cited by examiner

*Primary Examiner* — Kiho Kim
(74) *Attorney, Agent, or Firm* — Kile Park Goekjian Reed & McManus PLLC

(57) ABSTRACT

Provided is a one-chip vitality measuring image sensor. The image sensor includes one chip where a plurality of IR pixels and a plurality of visible pixels are alternately disposed, IR pass filters which are disposed on the IR pixels, and color pass filters which are disposed on the visible pixels. In the image sensor, IR strength and color strengths are obtained from light which is incident to the IR pixels and the visible pixels, and a vitality of a subject is measured by comparing the IR strength with the color strengths.

4 Claims, 5 Drawing Sheets

ONE CHIP IMAGE SENSOR FOR MEASURING VITALITY OF SUBJECT

BACKGROUND OF THE INVENTION

1. Field of the Invention

The present invention relates to an image sensor, and more particularly, to a one-chip vitality measuring image sensor for acquiring visible and IR images.

2. Description of the Related Art

Near-IR light is greatly reflected on leaves of plants, grasses, or the like. By comparing a Near-IR image with a visible image shown in FIG. 1, a vitality of a plant can be measured. A wavelength of the Near-IR light is in a range of 700 to 900 nanometers. The vitality of plant measured from these images can be used as an indicator for identifying a state of growth of the plant. In addition, the vitality can be used as an indicator for measuring a degree of freshness of plant for sale.

There is a method of acquiring the visible image and the Near-IR image, where a beam splitter, a visible image sensor, and an IR image sensor are used.

FIG. 2 is a view for explaining a conventional method using an image sensor. Referring to FIG. 2, light 10 including visible light and IR light is incident on a lens 21. The light 10 through the lens 21 is split by a beam splitter 22 to be transmitted to an IR cutoff filter 23 and an IR pass filter 25. The IR cutoff filter 23 filters the IR light from the light 10 and transmits the visible beam to a first sensor 24. The IR pass filter 25 passes only the IR light of the light 10 and transmits the IR light to a second sensor 26. The first sensor 24 is a visible image sensor which outputs the visible image. The second sensor 26 is an IR image sensor which outputs the IR image.

The visible and near-IR images acquired by the first and second sensors 24 and 26 are processed by an image signal processor (ISP). Before the images are processed by the ISP, the visible and near-IR images are temporarily stored in a frame buffer.

In the method of acquiring the visible and near-IR images, the optical filters including the IR cutoff filter 23 and the IR pass filter 25 are not easy to manipulate, and complicated operations for identifying the same points on several images are required. In addition, since complicated frame buffer and optics are needed, the cost is increased.

SUMMARY OF THE INVENTION

The present invention provides a method of measuring a vitality of a subject by using an image sensor.

According to an aspect of the present invention, there is provided a method of measuring a vitality of a subject by using an image sensor, comprising: receiving light reflected on the subject through a lens by using an image sensor; obtaining IR strength and color strengths from the light which is incident to a plurality of IR pixels and a plurality of visible pixels which are alternately disposed on the image sensor; and measuring a vitality of the subject by comparing the IR strength with the color strengths.

According to another aspect of the present invention, there is provided a method of measuring a vitality of a subject by using an image sensor, comprising: receiving light reflected on the subject through a lens by using an image sensor; obtaining IR strength and color strengths from the light which is incident to a plurality of white pixels and a plurality of visible pixels which are alternately disposed on the image sensor; and measuring a vitality of the subject by comparing the IR strength with the color strengths.

DETAILED DESCRIPTION OF PREFERRED EMBODIMENTS

Figure 1:
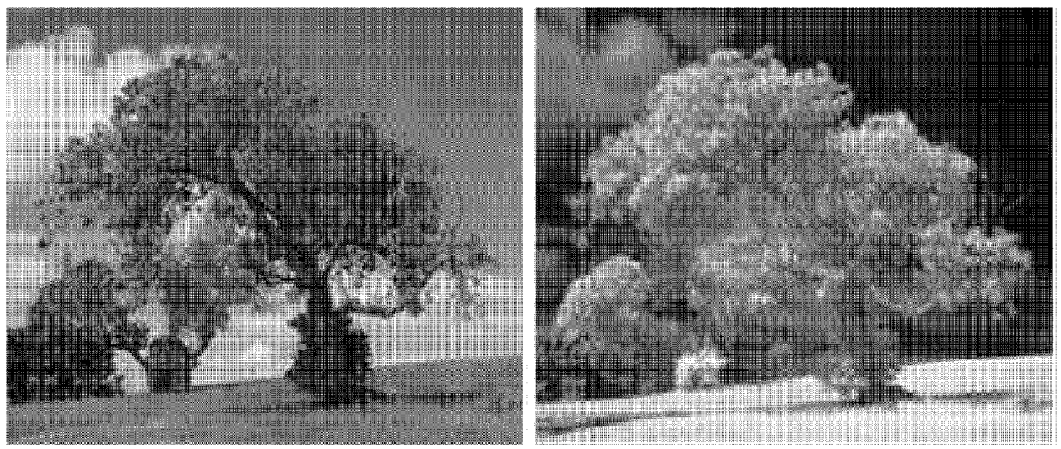
FIG. 1 is a view showing a Near-IR image and a visible image.
Figure 2:
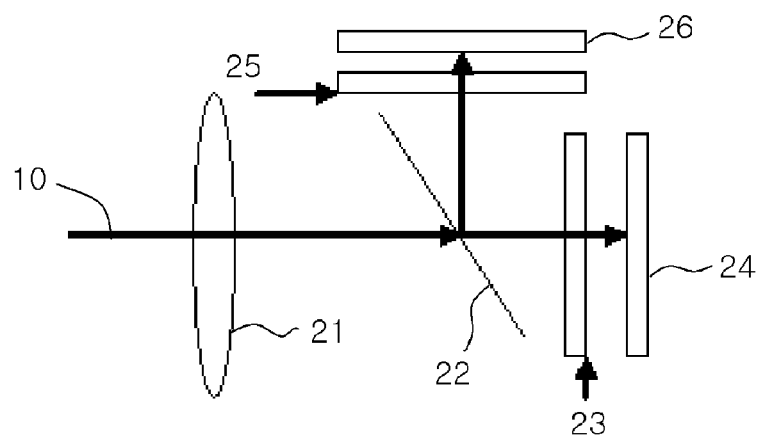
FIG. 2 is a view for explaining a conventional method using an image sensor.

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings. Like reference numerals in the drawings denote like elements.

Figure 3:
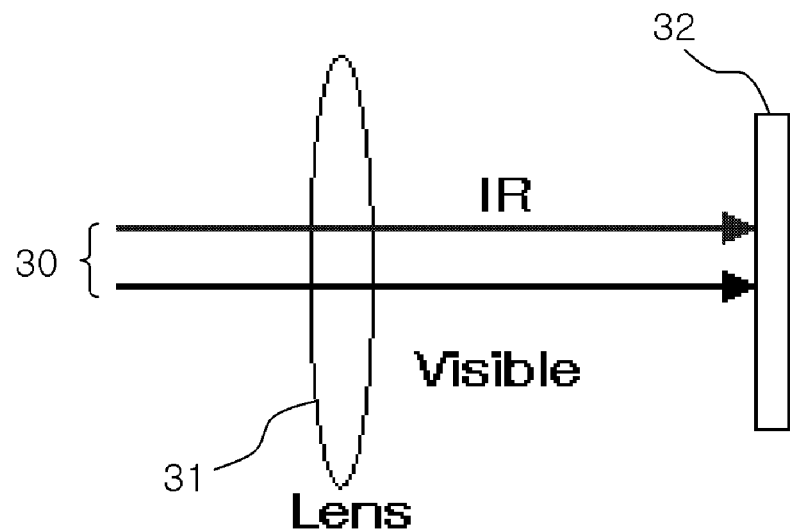
FIG. 3 is a view for explaining a method of using an image sensor according to an embodiment of the present invention.

FIG. 3 is a view for explaining a method of using an image sensor according to an embodiment of the present invention.

Referring to FIG. 3, light 30 including visible light and IR light is incident on a lens 31 to be transmitted to an image sensor 32.

Figure 4:
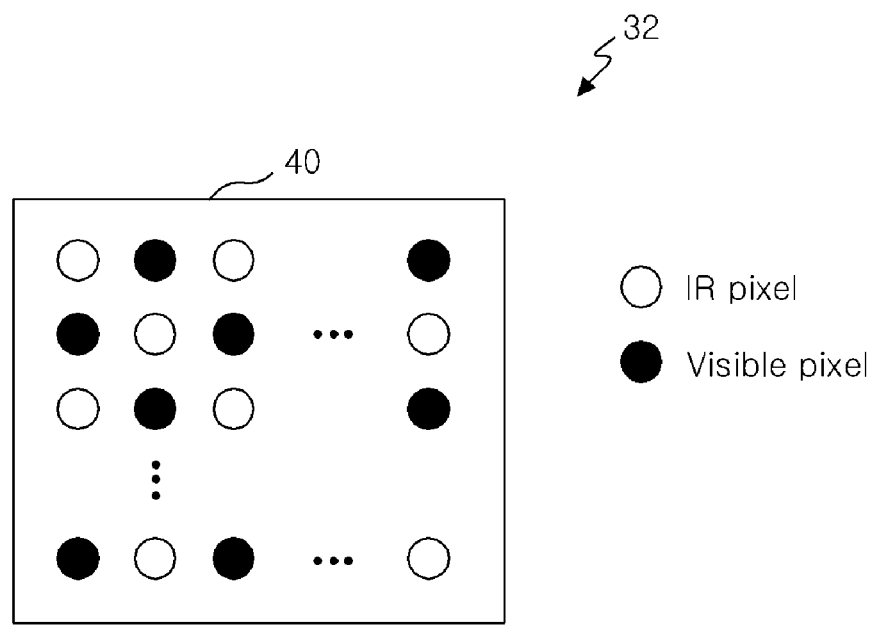
FIG. 4 is a view showing a pixel array in the image sensor of FIG. 3.

The image sensor 32 has a pixel array shown in FIG. 4.

Referring to FIG. 4, visible pixels and IR pixels are alternately disposed on a chip 40.

Figure 5:
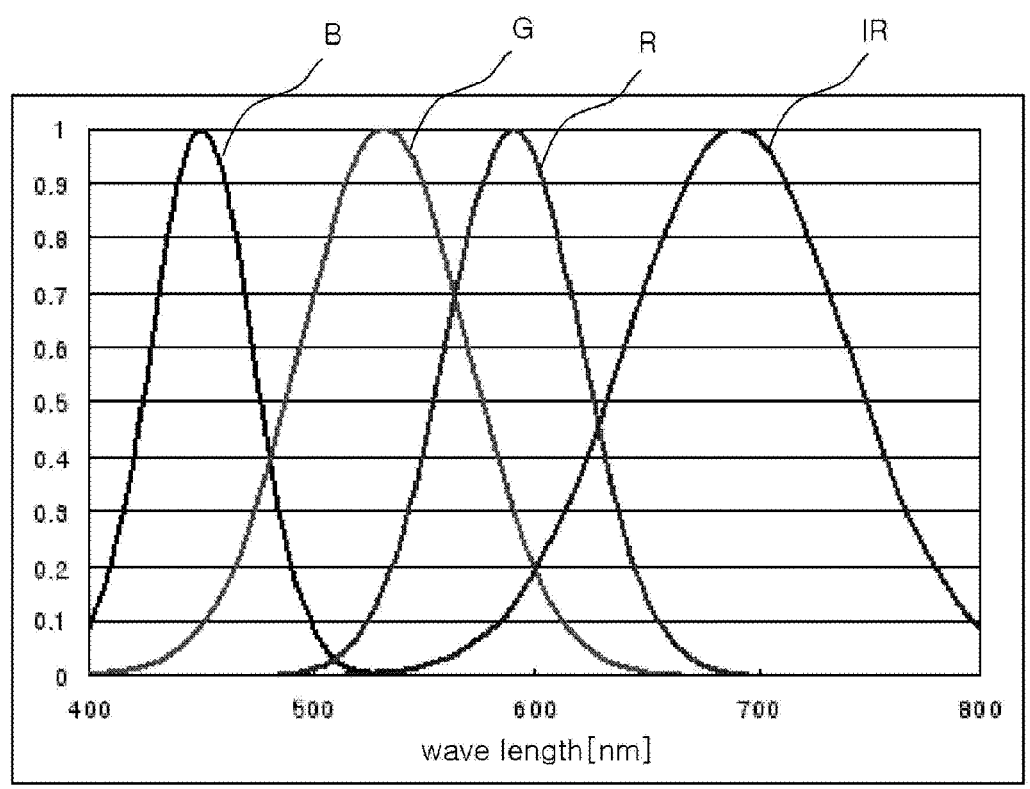
FIG. 5 is a view showing characteristics of filters passing blue (B), green (G), red (R), and infrared (IR) light according to a first example.

FIG. 5 is a view showing characteristics of filters passing blue (B), green (G), red (R), and infrared (IR) light according to a first example. The filters having color passing spectra shown in FIG. 5 are disposed in a manner shown FIG. 6 on the pixel array shown in FIG. 4.

Figure 6:
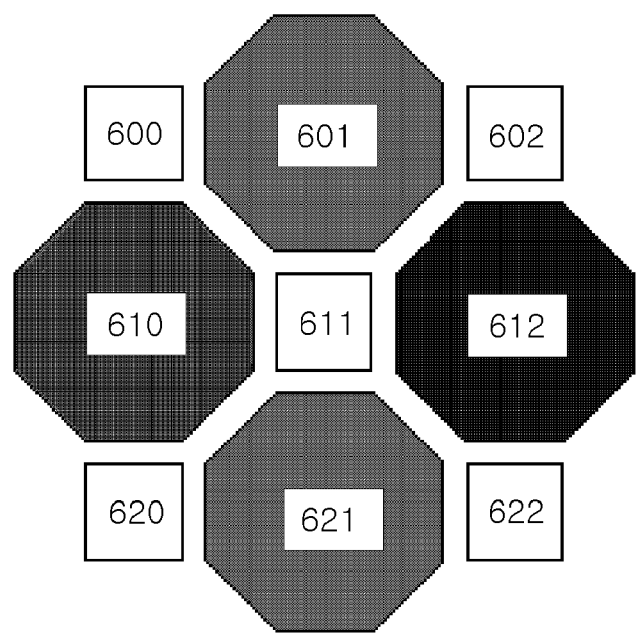
FIG. 6 is a view showing a layout of filters having color transmission spectra of FIG. 5.

Referring to FIGS. 4 and 6, filters 601, 610, 612, and 621 are disposed over the visible pixels shown in FIG. 4, and filters 602, 611, 620, and 622 are disposed over the IR pixels. For example, the filters 601 and 621 may be green pass filters, the filter 610 may be a red pass filter, and the filter 612 may be a blue pass filter. The filters 611, 602, 620, and 622 may be IR pass filters. In the embodiment, the red pass filters 611, 602, 620, and 622 may be larger than the filters 601, 610, 612, and 621. Alternatively, the filters 601, 610, 612, and 621 may be disposed with various colors.

With reference to FIGS. 4 to 6, a method of measuring a vitality from the IR light incident to the IR pixel corresponding to the filter 611 (hereinafter, referred to as a point-611 pixel") is described. Strengths (intensities) of R, G, and B light of the point-611 pixel are calculated from adjacent pixels. In the one example of estimating the strengths of R, G, and B lights, the color strengths of the point-611 pixel are estimated as follows; R=(point-610 pixel), G={(point-601 pixel)+(point-621 pixel)}/2, and B=(point-612 pixel). The vitality can be calculated by comparing the estimated color strengths of the point-611 pixel with the IR strength of the point-611 pixel. For the convenience of description, it is assumed that the strengths of R, G, and B light and the IR strength are 1 in the white patch in the daylight where reflectance is uniform over all wavelengths. If the vitality of the case is set to be 1, the vitality of a subject is defined as follows.

$$(\text{Vitality}) = 2 * IR/(R+IR) \quad \text{[Equation 1]}$$

For example, the vitality of a subject having reflectance of R=0.5 and IR=1 is 2/1.5=1.33.

Here, the IR sensitivity and the R sensitivity are determined based on characteristics of the IR filter and the red filter 610 and characteristics of the image sensor 32.

In a method of measuring a vitality of the visible pixel, the R strength of the visible pixel is obtained, and the IR strength of the visible pixel is estimated. Next, the vitality is calculated by using Equation 1.

Accordingly, the vitality of the subject at each point can be calculated by the ISP which performs the operation of Equation 1. The light reflected on the subject is transmitted through the lens 31 to be incident on the color pixels adjacent to the IR pixel. In the ISP, the IR strength of the IR pixel and the R strength of the color pixels are processed so as to obtain the vitality image.

Therefore, in the image sensor 32, the frame buffer for storing IR images and color images and the optics required for the conventional technique are not needed.

Figure 7:
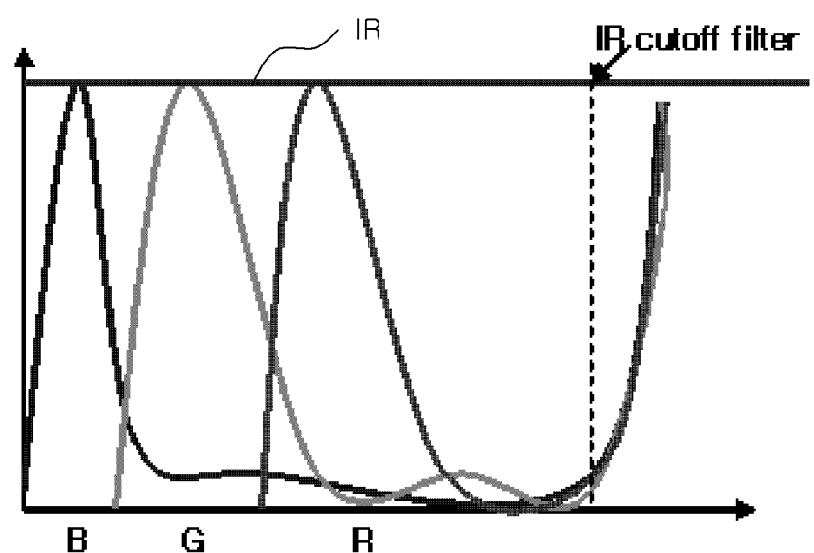
FIG. 7 is a view showing characteristics of filters passing blue (B), green (G), red (R), and infrared (IR) light according to a second example.

FIG. 7 is a view showing characteristics of filters passing blue (B), green (G), red (R), and infrared (IR) light according to a second example. Referring to FIG. 7, the B, G, and R filters have characteristics where the corresponding specific spectra are passed and transmittance in far-IR region is increased. A far-IR cutoff filter filters the far-IR light.

Figure 8:
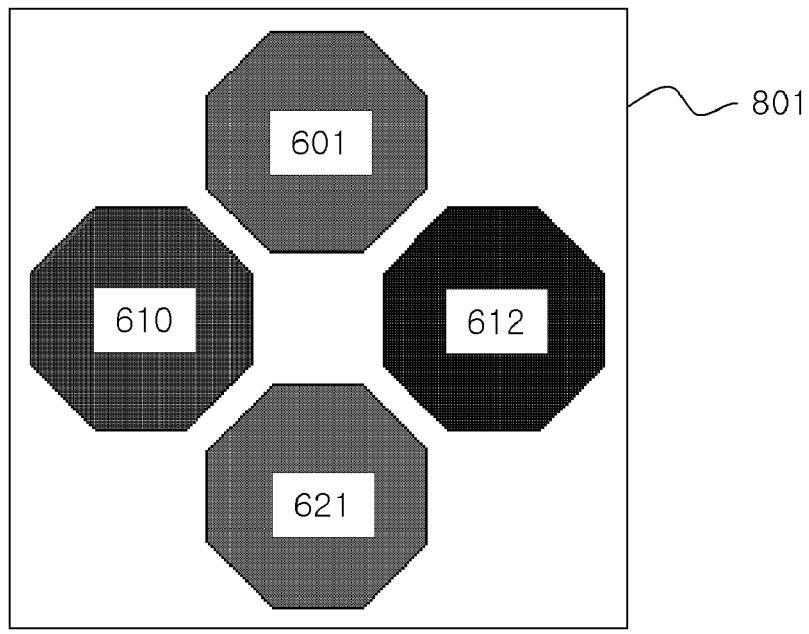
FIG. 8 is a view showing a layout of filters having color transmission spectra of FIG. 7.

The filters having the color passing spectra shown in FIG. 7 are disposed on the pixel array shown in FIG. 4 in a manner shown in FIG. 8. In addition, white pixels which can sense all of the B, G, R, and IR light are disposed at the position of the IR pixels shown in FIG. 4. Referring to FIG. 8, the green pass filters 601 and 621, the blue pass filter 612, and the red pass filter 620 are disposed over the visible pixels shown in FIG. 4, and the far-IR cutoff filters 801 are disposed over all the pixels.

Figure 9:
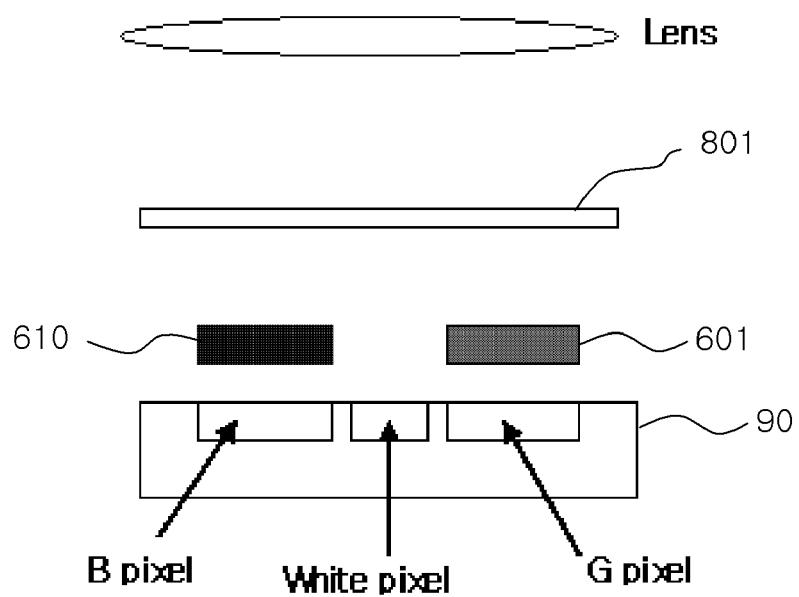
FIG. 9 is a cross-sectional view showing an image sensor associated with FIGS. 4, 7, and 8.

FIG. 9 is a cross-sectional view showing an image sensor associated with FIGS. 4, 7, and 8. For example, referring to FIG. 9, the blue and green filters 610 and 601 are disposed over the visible pixels (B and G pixels) formed on a semiconductor substrate 90. The far-IR cutoff filters are disposed over the color filters 610 and 601. Therefore, the IR strength of the white pixel is obtained by subtracting the R, G, and B strengths of the adjacent color filters from the strength W of the white pixel. In the image sensor, the IR filter for passing only the IR light is not needed.

In the image sensor according to the present invention, the vitality of subject is measured by using visible pixels and IR pixels arrayed in a single chip. Therefore, in the image sensor, complicated frame buffer and optics are not needed, so that it is possible to reduce the cost.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of measuring a vitality of a subject by using an image sensor, comprising:
   receiving light reflected on the subject through a lens by the image sensor, wherein the image sensor includes a plurality of IR pixels and a plurality of visible pixels;
   obtaining IR strength of the light which is incident to the IR pixels;
   obtaining color strengths of the light which is incident to the visible pixels; and
   measuring a vitality of the subject based on equation of $$\text{vitality} = 2 \times IR/(R+IR)$$

wherein 'IR' denotes the IR strength and 'R' denotes the color strengths.

2. The method of claim 1, wherein the obtaining the IR strength and the color strengths comprises:
   obtaining the IR strength from IR light which is incident to the IR pixels; and
   obtaining the color strengths from strengths of R-, G-, and B-light which are incident R-, G-, and B-pixels, respectively, which are disposed in the image sensor.

3. The method of claim 1, wherein the obtaining the IR strength and the color strengths comprises:
   obtaining a strength at a white pixel to which the light is incident through a far-IR cutoff filter;
   obtaining the color strengths at R-, G-, and B-pixels to which the light is incident through the far-IR cutoff filter; and
   estimating the IR strength by subtracting the color strengths from the strength at the white pixel.

4. A method of measuring a vitality of a subject by using an image sensor, comprising:
   receiving light reflected on the subject through a lens by the image sensor, wherein the image sensor includes a plurality of white pixels and a plurality of visible pixels;
   obtaining IR strength of the light which is incident to the white pixels;
   obtaining color strengths of the light which is incident to the visible pixels; and
   measuring a vitality of the subject by comparing the IR strength with the color strengths,
   wherein the obtaining the IR strength and the color strengths comprises:
   obtaining the color strengths from strengths of R-, G-, and B-light which are incident to R-, G-, and B-pixels, respectively, which are disposed in the image sensor; and
   obtaining the IR strength of an arbitrary white pixel from a difference between a white strength of the arbitrary white pixel and the color strengths.

* * * * *